US009817139B2

(12) United States Patent
Shimizu et al.

(10) Patent No.: US 9,817,139 B2
(45) Date of Patent: Nov. 14, 2017

(54) UNDERWATER OBSERVATION APPARATUS

(71) Applicants: Japan Agency for Marine-Earth Science and Technology, Yokosuka-shi, Kanagawa (JP); Nippon Marine Enterprises, Ltd., Yokosuka-shi, Kanagawa (JP)

(72) Inventors: Satoshi Shimizu, Kanagawa (JP); Takuya Maekawa, Kanagawa (JP); Yoshitaka Watanabe, Kanagawa (JP); Kiyoshi Hatakeyama, Kanagawa (JP)

(73) Assignees: JAPAN AGENCY FOR MARINE-EARTH SCIENCE AND TECHNOLOGY, Yokosuka-Shi (JP); NIPPON MARINE ENTERPRISES, LTD., Yokosuka-Shi (JP)

( * ) Notice: Subject to any disclaimer, the term of this patent is extended or adjusted under 35 U.S.C. 154(b) by 103 days.

(21) Appl. No.: 14/646,572

(22) PCT Filed: May 21, 2013

(86) PCT No.: PCT/JP2013/064128
§ 371 (c)(1),
(2) Date: May 21, 2015

(87) PCT Pub. No.: WO2014/080651
PCT Pub. Date: May 30, 2014

(65) Prior Publication Data
US 2015/0301206 A1 Oct. 22, 2015

(30) Foreign Application Priority Data

Nov. 21, 2012 (JP) ................................. 2012-255619

(51) Int. Cl.
*G01V 1/18* (2006.01)
*G01V 1/16* (2006.01)
(Continued)

(52) U.S. Cl.
CPC ................. *G01V 1/18* (2013.01); *B63G 8/14* (2013.01); *G01B 7/00* (2013.01); *G01V 1/162* (2013.01);
(Continued)

(58) Field of Classification Search
CPC . G01B 7/00; G01V 1/18; G01V 1/162; G01V 1/38; G01V 2210/1427; B63G 8/14;
(Continued)

(56) References Cited

U.S. PATENT DOCUMENTS 2,241,127 A * 5/1941 Harder ..................... H02H 3/44
336/174
3,263,196 A * 7/1966 Reber .................... H01F 27/327
174/121 R
(Continued)

FOREIGN PATENT DOCUMENTS

JP S62-052485 3/1987
JP 63-191918 8/1988
(Continued)

OTHER PUBLICATIONS

Excerpt of Tsuchiya 2012 reference included with IDS of Jun. 2, 2015, translated into English, second page, second column, section 3.1.*
(Continued)

*Primary Examiner* — Daniel L Murphy
(74) *Attorney, Agent, or Firm* — Rankin, Hill & Clark LLP (57) ABSTRACT

An underwater observation apparatus includes an observation apparatus body, a weight structure, a coupling device, and a fusion cutting device. The observation apparatus body is configured to house at least a power source, a communication circuit for a communication device, and a signal processing device. The coupling device couples the obser- (Continued)

vation apparatus body with the weight structure via a remote-controlled release structure capable of releasing the observation apparatus body from the weight structure. The underwater observation apparatus also includes a power feeding coil located inside of a glass sphere to generate magnetic flux, and a power receiving coil located outside of the glass sphere. The power receiving coil generates an induced voltage when interlinked by the magnetic flux generated by the power feeding coil. The power receiving coil is configured to supply drive power to the fusion cutting device.

18 Claims, 5 Drawing Sheets

(51) Int. Cl.
| | |
|---|---|
| *B63G 8/14* | (2006.01) |
| *G01B 7/00* | (2006.01) |
| *H02J 1/00* | (2006.01) |
| *H04B 11/00* | (2006.01) |
| *H04B 13/02* | (2006.01) |
| *F21V 33/00* | (2006.01) |
| *F21W 131/10* | (2006.01) |
| *G01V 1/38* | (2006.01) |
| *F21W 111/047* | (2006.01) |
| *F21Y 101/00* | (2016.01) |
| *F21Y 115/10* | (2016.01) |

(52) U.S. Cl.
CPC ............... *H02J 1/00* (2013.01); *H04B 11/00* (2013.01); *H04B 13/02* (2013.01); *F21V 33/0076* (2013.01); *F21W 2111/047* (2013.01); *F21W 2131/10* (2013.01); *F21Y 2101/00* (2013.01); *F21Y 2115/10* (2016.08); *G01V 1/38* (2013.01); *G01V 2210/1427* (2013.01)

(58) Field of Classification Search
CPC  H04B 11/00; H04B 13/02; H02J 1/00; F21W 2131/10; F21W 2111/047; F21V 33/0076; F21Y 2101/00; F21Y 2115/10
USPC .......................................................... 367/15
See application file for complete search history.

(56) References Cited

U.S. PATENT DOCUMENTS

| | | | | |
|---|---|---|---|---|
| 7,088,222 | B1* | 8/2006 | Dueker | .................... B60Q 7/00 340/321 |
| 2015/0354800 | A1* | 12/2015 | Zagoras | .................. F21V 15/01 362/276 |

FOREIGN PATENT DOCUMENTS

| | | |
|---|---|---|
| JP | 10-287293 | 10/1998 |
| JP | 2000-205898 | 7/2000 |
| JP | 2000-292548 | 10/2000 |
| JP | 2004-166459 | 6/2004 |
| JP | 2006-030124 | 2/2006 |
| JP | 2007-210402 | 8/2007 |
| JP | 2012-147638 | 8/2012 |
| JP | 2012-245944 | 12/2012 |
| WO | 2012/039045 | 3/2012 |

OTHER PUBLICATIONS

Tsuchiya "The Round Trip Type Deep Sea Investigation Vehicle "Edokko No. 1" Development Project"; The 23rd Ocean Engineering Symposium, Aug. 2-3, 2012, 4 pages, only abstract is in English.

* cited by examiner

UNDERWATER OBSERVATION APPARATUS

TECHNICAL FIELD

The present invention relates to an underwater observation apparatus including an external load located outside of a housing and configured to be operated by a drive power supplied from a power source.

BACKGROUND ART

There have conventionally been known underwater observation apparatuses including an external load located outside of a housing and configured to be operated by a drive power supplied from a power source. Examples of this type of underwater observation apparatus include an ocean bottom seismograph (OBS) deployed on the sea bottom for seismic observation.

If power is supplied from the power source located inside of the housing forming a body of the underwater observation apparatus to an external load located outside of the housing in the related art, a through hole is formed in a wall of the housing, and a connection cable is used to connect between the external load and the power source through a watertight connector. JP 2006-30124 A (Patent Document 1) describes an example of a release structure configured to release the observation apparatus body from a weight structure attached to the observation apparatus body.

RELATED ART DOCUMENT

Patent Document

PATENT DOCUMENT 1: JP 2006-30124 A

SUMMARY OF INVENTION

Technical Problem

However, forming a through hole in a wall of the housing disadvantageously reduces the strength of the housing. If the housing is to be used underwater, in particular, it is desirable that no hole should be formed in a wall of the housing because the housing is required to have a pressure-resistant structure in order to resist against a water pressure, and to have a watertight construction.

An object of the present invention is to provide an underwater observation apparatus capable of driving an external load located outside of a housing using a power source located inside of the housing without reducing the strength of the housing.

Another object of the present invention is to provide an underwater observation apparatus capable of charging a power storage of the power source located inside of the housing from the outside of the housing.

Still another object of the present invention is to provide an underwater observation apparatus that causes no erroneous operation due to interference between components provided in the underwater observation apparatus.

Yet another object of the present invention is to provide an underwater observation apparatus that facilitates recovery work after the ascent of the housing.

Solution to Problem

The present invention provides an underwater observation apparatus including a housing and an external load. The housing is configured to house at least a power source including a power storage, a communication circuit of a communication device, and a signal processing device. The external load is located outside of the housing and configured to be operated by a drive power supplied from the power source. For example, if the underwater observation apparatus according to the present invention is applied to an ocean bottom seismograph to be deployed underwater, the housing forms an observation apparatus body. In order to protect devices housed inside the housing, the housing is formed as a pressure-resistant container such as a glass sphere that is resistant to a water pressure and that has a watertight construction.

The underwater observation apparatus according to the present invention further includes a power feeding coil and a power receiving coil. The power feeding coil is located inside of the housing to generate magnetic flux induced by a current supplied from the power source. The power receiving coil is located outside of the housing to generate an induced voltage when interlinked by the magnetic flux generated by the power feeding coil. Thus, the power feeding coil and the power receiving coil located inside and outside of the housing, respectively, and the drive power to the external load is supplied from the power receiving coil. According to the present invention, power for driving the external load can be supplied from the power source housed inside of the housing to the external load without using a power distribution cable. Therefore, there is no need to form a through hole in a wall of the housing, which avoids reducing the strength of the housing. This also facilitates providing a watertight structure to the housing. The power receiving coil located outside of the housing is preferably molded with a molding material such as a resin in a watertight manner.

The power feeding coil and the power receiving coil may be of any type as long as the coils can be located and used as described above. For example, if the coils are each an air-core coil in a swirling shape, this facilitates placing the power feeding coil and the power receiving coil opposite to each other across a wall of the housing. In addition, the coils can be thinned, and the installation space for the power feeding coil can be reduced, contributing to a reduction in size of the housing.

If the power feeding coil and the power receiving coil are each an air-core coil in a swirling shape, the power feeding coil and the power receiving coil may have a flat shape. If the housing is spherical, meanwhile, the coils may be shaped along the shape of a wall surface of the housing with their air-core portion formed in a convexed shape. In this case, the power feeding coil may be configured such that an air-core portion of the coil is convexed toward a wall surface of the housing, and the power receiving coil may be configured such that an air-core portion of the coil is convexed in a direction away from a wall surface of the housing. This allows the power feeding coil and the power receiving coil to be located opposite to each other at positions closer to the housing, enhancing the power feeding efficiency.

In order to recover the housing (and devices housed inside the housing) after observation, for maintenance, or the like, the underwater observation apparatus according to the present invention may further include a buoyancy generating unit configured to provide buoyancy to the housing. The buoyancy generating unit may be implemented by filling the housing with a gas to cause the housing itself to generate buoyancy, attaching to the housing a separate buoyant member filled with a gas, or a buoyant material that has a small specific gravity and that is pressure-resistant. If the underwater observation apparatus includes a buoyancy generating unit configured to provide buoyancy to the housing, the underwater observation apparatus may also include a weight structure and a coupling device. The housing is attached to the weight structure. The coupling device is configured to couple the housing with the weight structure via a remote-controlled release structure capable of releasing the housing from the weight structure. The release structure is configured to release the housing from the weight structure and to allow the housing to move upward by buoyancy for recovery. Such a configuration allows the housing to be recovered by actuating the release structure when necessary.

The external load to be supplied with power is not limited. For example, at least a part of the external load may be an electrical component included in the release structure. In this case, the coupling device may include a closed-loop member including one or more fusible portions formed from a thermoplastic material. The release structure may be located between the closed-loop member and the weight structure, and configured to hold the housing when the closed-loop member is closed and to release the housing when the closed-loop member is opened. The release structure may include, as the electrical component, one or more fusion cutting devices operable to fuse and disconnect the fusible portions of the closed-loop member to open the closed-loop member. Such a configuration allows power for driving the one or more fusion cutting devices to be supplied from the power source housed inside of the housing in a non-contact manner, opening the closed-loop member to release the housing. The power receiving coil receives AC power. If the fusion cutting devices can be driven by any of DC power and AC power, there is no need to provide an AC-DC conversion circuit. Therefore, there is no need to provide another pressure-resistant container outside of the housing to protect such an AC-DC conversion circuit.

The underwater observation apparatus according to the present invention may be configured to actuate the release structure in a time-limited manner. However, the underwater observation apparatus according to the present invention may be configured to actuate the release structure for recovery in response to a signal transmitted from the ground or at sea. In this case, for example, the communication device may include a transducer and the communication circuit. The transducer is installed outside of the housing to perform acoustic communication underwater. The communication circuit is installed inside of the housing. The communication device thus transmits and receives a signal through acoustic communication. If the communication device is configured in this way, the communication circuit is required to include a matching coil for impedance matching. Therefore, magnetic flux generated by the power feeding coil may interlink with the matching coil to cause the matching coil to generate an induced voltage to result in noise, depending on the position of the matching coil. Thus, in the present invention, the matching coil and the power receiving coil may be arranged such that a first assumed magnetic force line extending in a coil winding axis direction of the power feeding coil is orthogonal to a second assumed magnetic force line extending in a coil winding axis direction of the matching coil. Such an arrangement suppresses mutual interference between the matching coil and the power feeding coil, preventing an erroneous operation due to noise or the like. The term "orthogonal" as used herein not only means being exactly orthogonal but also allows for a certain degree of deviation.

In order to improve the visibility of the housing from a worker during recovery of the housing which has floated on the water surface by buoyancy, the underwater observation apparatus according to the present invention may further include a light-emitting device attached inside or outside of the housing to emit light upward of a water surface when the release structure releases and allows the housing to float by buoyancy for recovery and a portion of the housing is exposed from the water surface. A xenon lamp or the like may be used as the light source of the light-emitting device. In the underwater observation apparatus according to the present invention which is able to supply only a limited amount of power, however, a light-emitting diode of which the power consumption is low may be used in place of a xenon lamp. It should be noted that the light-emitting diode emits light with high directivity. Thus, the light-emitting device which uses the light-emitting diode preferably includes a plurality of light-emitting diodes arrayed in an annular arrangement at predetermined intervals to surround a center point of the portion of the housing that is to be exposed from the water surface, and oriented at an angle determined to emit light obliquely upward with respect to the water surface. The thus configured light-emitting device improves the visibility for a ship on the sea while allowing the use of the light-emitting diodes as the light source.

Unlike the housing according to the related art in which power is fed to the external load via wires, the weight balance of the housing is varied particularly by the addition of the weights of the power feeding coil and the power receiving coil. Thus, in order for light emitted from the light-emitting device to be emitted upward of the water surface, the transducer for acoustic communication may be provided and disposed on top of the housing, the power storage may be disposed close to a bottom portion of the housing, and the power feeding coil, the power receiving coil, and other components may be located such that the light emitted from the light-emitting device is emitted upward of the water surface when the housing is released underwater and a portion of the housing is exposed from the water surface.

The light-emitting device may be disposed either inside or outside of the housing. If the light-emitting device is disposed inside of the housing, at least a part of the housing is optically transparent to allow transmission of the light emitted from the plurality of light-emitting diodes. An attachment portion may be provided inside of the housing, the attachment portion including an inclined surface inclined toward the center point of the portion of the housing to be exposed from the water surface discussed earlier, and the plurality of light-emitting diodes may be attached to the inclined surface. With such a configuration, the power source in the housing and the light-emitting device can be connected through a connection cable to cause the light-emitting diode to emit light. If the light-emitting device is fixed outside of the housing, the light-emitting device may be the external load discussed above, and may be supplied with power from the power source in the housing.

In the underwater observation apparatus according to the present invention, the power source may further include a charge power receiving coil and a charge circuit. The charge power receiving coil is disposed inside of the housing to be interlinked by magnetic flux generated by a charge power feeding coil to be disposed outside of the housing. The charge circuit is configured to charge the power storage using output from the charge power receiving coil. Such a configuration allows the power storage to be charged without opening the housing.

In order to facilitate recovery of the housing after the housing moves upward by buoyancy, the housing may include a radio beacon configured to transmit a position signal indicating a position of the housing which has been released to move upward by buoyancy. In order for a radio beacon to transmit a position signal, it is necessary that the radio beacon antenna should project upward from the water surface when the housing is released underwater and a portion of the housing is exposed from the water surface. In the present invention, unlike the underwater observation apparatus according to the related art in which power is fed to the external load via wires, the weight balance of the housing is varied particularly by the addition of the weights of the power feeding coil and the power receiving coil. Thus, if the transducer for acoustic communication is provided and disposed on top of the housing, the power storage is disposed close to a bottom portion of the housing, and the power feeding coil, the power receiving coil, and other components are located such that the radio beacon antenna projects upward from the water surface when the housing is released underwater and a portion of the housing is exposed from the water surface. Such a configuration allows the radio beacon antenna to be exposed from the water surface after the housing moves upward by buoyancy, facilitating recovery of the housing.

BRIEF DESCRIPTION OF DRAWINGS

FIG. 1 is an overall view showing a recovery observation apparatus (underwater observation apparatus) according to an embodiment of the present invention, in which

FIG. 2 is an overall view showing the internal structure of an observation apparatus body according to the embodiment of FIG. 1, in which

DESCRIPTION OF EMBODIMENTS

Figure 1A:
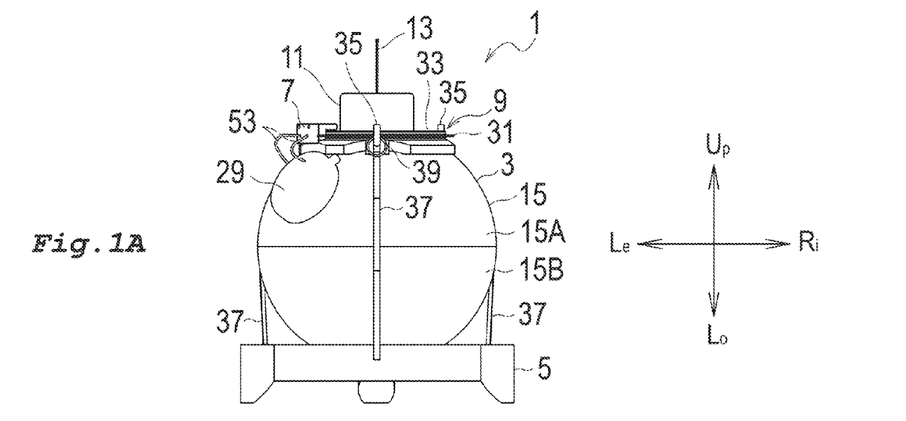
FIG. 1A is a front view.
Figure 1B:
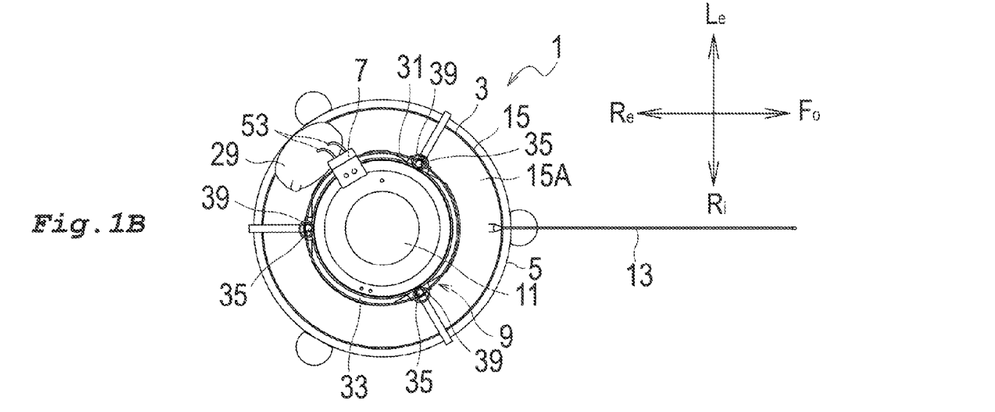
FIG. 1B is a plan view.
Figure 1C:
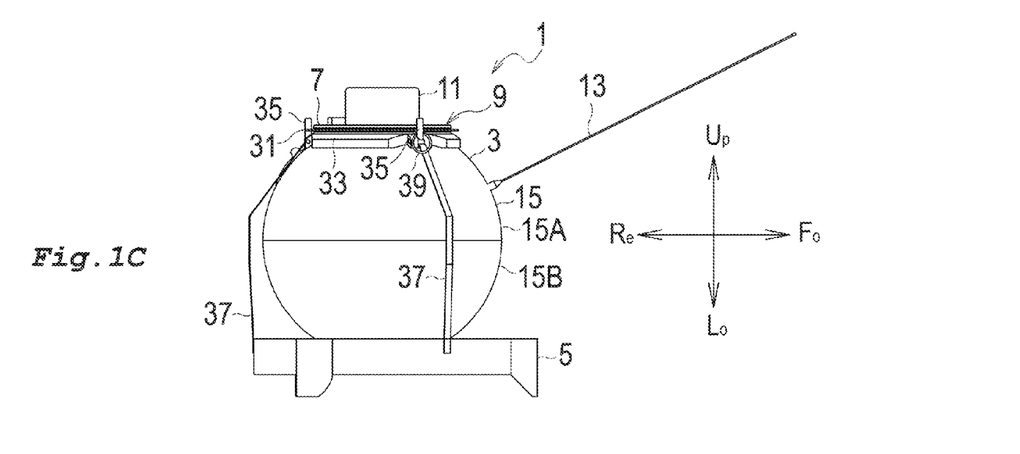
FIG. 1C is a right side view.
Figure 2A:
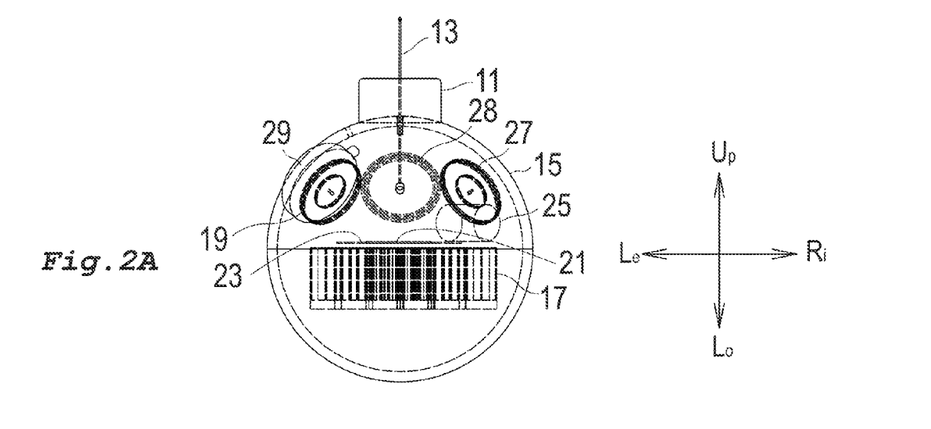
FIG. 2A is a front view.
Figure 2B:
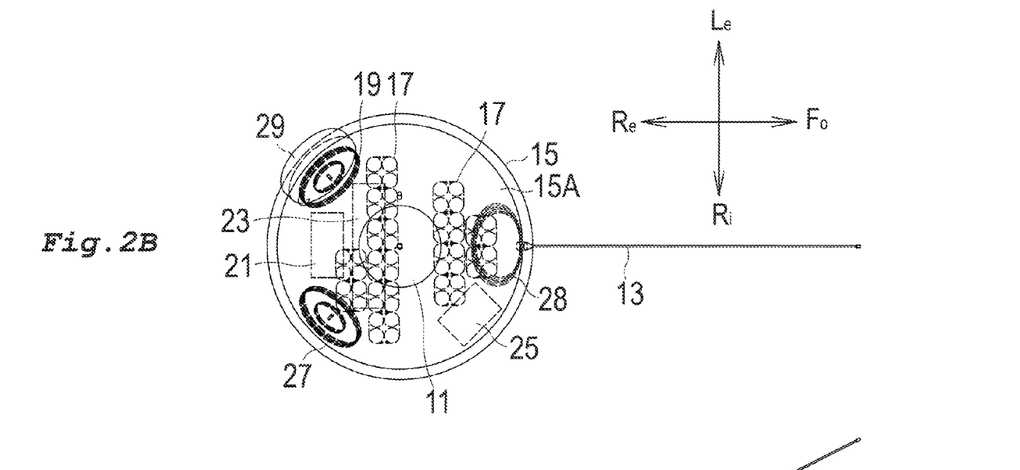
FIG. 2B is a plan view.
Figure 2C:
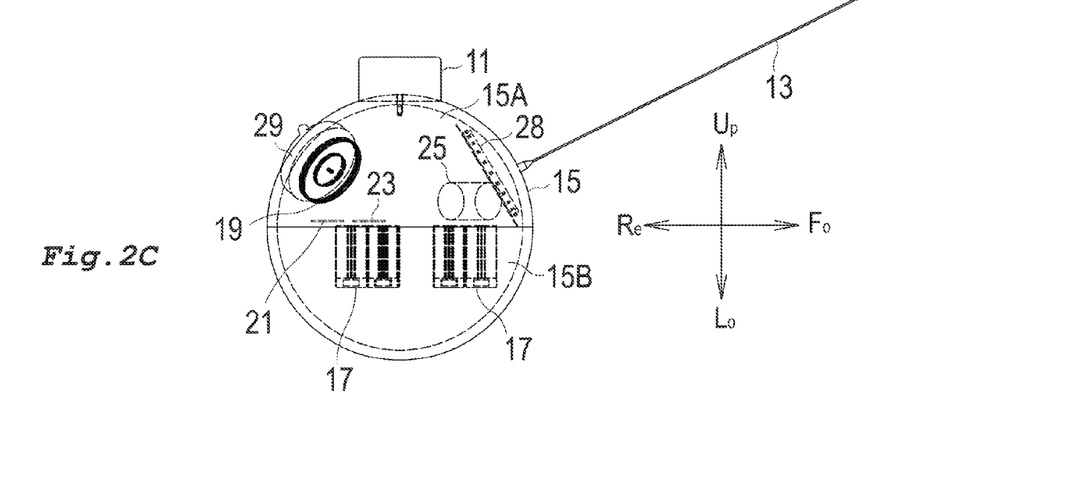
FIG. 2C is a right side view.
Figure 3:
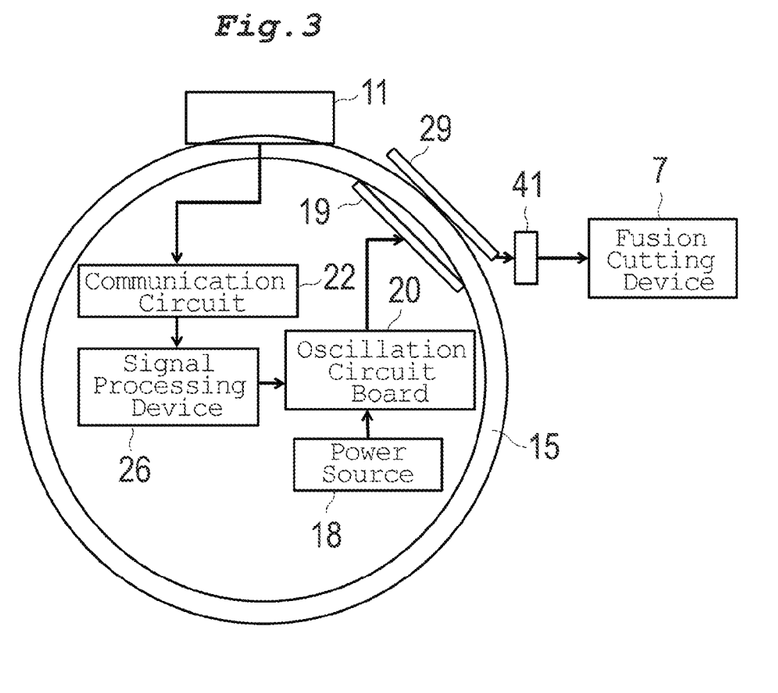
FIG. 3 is a block diagram showing the configuration of the underwater observation apparatus according to the embodiment shown in FIGS. 1 and 2.

An underwater observation apparatus according to an embodiment of the present invention will be described below with reference to the drawings. FIG. 1 is an overall view showing a recovery observation apparatus (underwater observation apparatus) serving as an ocean bottom seismograph (OBS) according to an embodiment of the present invention, in which FIG. 1A is a front view, FIG. 1B is a plan view, and FIG. 1C is a right side view. FIG. 2 is an overall view showing the internal structure of a body of the underwater observation apparatus according to the embodiment, in which FIG. 2A is a front view, FIG. 2B is a plan view, and FIG. 2C is a right side view. FIG. 3 is a block diagram showing the configuration of the underwater observation apparatus according to the present invention. For convenience of description, a glass sphere 15 is shown as non-transparent in FIGS. 1A to 1C, and shown as transparent in FIGS. 2A to 2C in order to show the internal structure. Some members are not shown. Members housed inside the glass sphere 15 are indicated by dotted lines.

Herein, as shown in FIGS. 1 and 2, a plurality of directions are defined for the underwater observation apparatus 1. That is, as shown in FIGS. 1 and 2, such directions include a vertical direction including an upward direction UP and a downward direction LO, a back-and-forth direction including a forward direction FO and a rearward direction RE, and a lateral direction including a rightward direction RI and a leftward direction LE.

<Overall Configuration>

The underwater observation apparatus 1 includes an observation apparatus body 3 (a housing having buoyancy), an anchor 5 (weight structure), a coupling device 9, a transducer 11, and a radio beacon (among components of which only a radio beacon antenna 13 is shown). The observation apparatus body 3 incorporates a measuring device such as a seismograph, and has buoyancy. The anchor 5 is used to moor the observation apparatus body 3 sunk on the sea bottom. The coupling device 9 couples the observation apparatus body 3 with the anchor 5, and includes a fusion cutting device 7. The transducer 11 is used for acoustic communication. The radio beacon transmits a position signal (position measurement information from a GPS (not shown)) indicating the position of the observation apparatus body 3.

The observation apparatus body 3 includes a transparent glass sphere 15 that is resistant to a water pressure to protect internal devices from intrusion of water. In the embodiment, the glass sphere 15 is a small glass sphere with a diameter of 13 inches. The glass sphere 15 is formed from an upper hemisphere portion 15A and a lower hemisphere portion 15B. The glass sphere 15 is formed by housing components in the lower hemisphere portion 15B and fixing the upper hemisphere portion 15A over the lower hemisphere portion 15B. The glass sphere 15 is filled with a gas so that the observation apparatus body 3 itself has buoyancy underwater.

The components housed inside the glass sphere 15 include a power source 18, a power feeding coil 19, an oscillation circuit board 21, a communication circuit board 23, a matching coil 25, a signal processing device 26, a charge power receiving coil 27, and a flasher (light-emitting device) 28, besides measuring devices such as an acceleration sensor and wiring configured to connect between the components (not shown). The power source 18 includes a lithium-ion battery 17. The power feeding coil 19 feeds power to the fusion cutting device 7. The oscillation circuit board 21 forms an oscillation circuit 20 configured to oscillate the power feeding coil 19. The communication circuit board 23 forms a communication circuit 22 for acoustic communication. The matching coil 25 is used for impedance matching. The signal processing device 26 processes a signal received by the transducer 11. The charge power receiving coil 27 charges the lithium-ion battery 17. When the transducer 11 receives an acoustic signal, the communication circuit 22 causes the signal processing device 26 to process the signal. The signal processing device 26 is configured to actuate the oscillation circuit 20 if the acoustic signal includes a release signal.

A power receiving coil 29 is located outside of the glass sphere 15 at a position opposite to the power feeding coil 19. The transducer 11 is attached on top of the glass sphere 15. Constituent elements of the coupling device 9 are provided around the transducer 11. The radio beacon antenna 13 is provided in front of the glass sphere 15. The transducer 11 is covered by a cover made of urethane rubber. The observation apparatus body 3, which includes the glass sphere 15 which is a pressure-resistant container, is made lighter than the weight of water to be displaced by the observation apparatus body 3, and therefore has buoyancy underwater. The anchor 5 is a heavy article made of a metal or the like. Although not shown, a plurality of attachment fittings are fixed to the anchor 5 for attachment of coupling members 37 to be discussed later.

<Coupling Device>

The coupling device 9 according to the embodiment includes a closed-loop member 31, and couples the observation apparatus body 3 with the anchor 5 via a release structure. The release structure mainly includes the fusion cutting device 7, three turning arms (retention mechanisms) 35, and three coupling members 37. The turning arms 35 are attached to a closed-loop shaft member 33 provided along the outer circumference of the glass sphere 15. The coupling members 37 are formed from string-like members that are stretchable or that can be adjustably fastened to an appropriate length. The lower ends of the turning arms 35 are fixed to the closed-loop shaft member 33. When the coupling members 37 are to be fixed, the turning arms 35 are oriented in the upward direction. When the coupling members 37 are to be released, the turning arms 35 are turned in the direction away from the observation apparatus body 3 with their lower ends serving as turning shafts. The coupling member 37 includes a retention ring 39 provided at one end thereof. The turning arm 35 passes through the retention ring 39. The other end of the coupling member 37 is fixed to an attachment fitting (not shown) provided to the anchor 5.

The closed-loop member 31 is retained to surround the turning arms 35 retained through the retention rings 39 of the coupling members 37, and extended over the three turning arms 35 to sequentially connect the three turning arms 35. This hinders the turning arms 35 from turning, fixing the coupling members 37. One fusion cutting device 7 is attached to the closed-loop member 31. In the embodiment, the closed-loop member 31 is formed from a thermoplastic material such as nylon. A portion of the closed-loop member 31 provided with the fusion cutting device 7 serves as a fusible portion.

<Configuration for Contactless Power Transmission>

Figure 4:
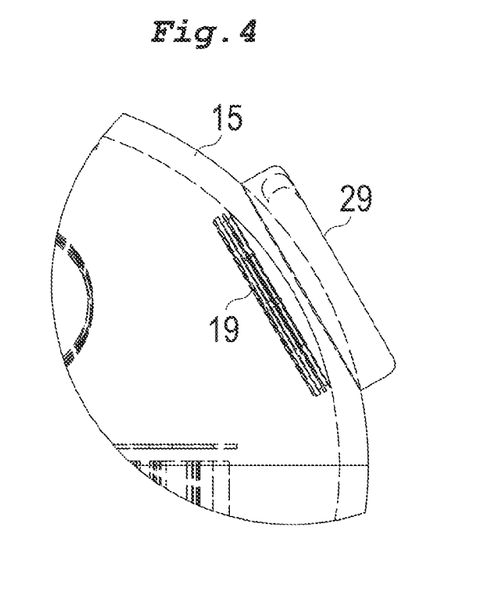
FIG. 4 is an enlarged view showing a power feeding coil and a power receiving coil disposed opposite to each other.

Next, the configuration for performing contactless power transmission through the power feeding coil 19 and the power receiving coil 29 to feed power to the fusion cutting device 7 serving as an external load will be described with reference to FIGS. 3 and 4. FIG. 3 is a block diagram showing the configuration of the underwater observation apparatus according to the present invention. FIG. 4 is an enlarged view showing the power feeding coil 19 and the power receiving coil 29 located opposite to each other.

As shown in FIG. 4, the power feeding coil 19 and the power receiving coil 29 are each an air-core coil in a swirling shape, and fixed to a wall surface of the glass sphere 15 with an adhesive material at positions opposite to each other such that the winding axis of the coil is oriented toward the wall surface of the glass sphere 15. The power receiving coil 29 is provided outside of the glass sphere 15, and directly immersed in water. Therefore, the power receiving coil 29 is molded with a water-proof resin such as a urethane.

As shown in FIG. 3, the power source 18 and the oscillation circuit 20 are connected to the power feeding coil 19. As discussed above, if the acoustic signal received by the transducer 11 includes a release signal, the oscillation circuit 20 is turned on in response to a command from the signal processing device 26. When the oscillation circuit 20 is turned on, the oscillation circuit 20 outputs AC power. Meanwhile, a matching capacitor 41 for impedance adjustment and the fusion cutting device 7 are connected to the power receiving coil 29. Therefore, when the oscillation circuit 20 is turned on, the oscillation circuit 20 outputs AC power, and the power feeding coil 19 generates magnetic flux. Then, the generated magnetic flux interlinks with the power receiving coil 29 to cause the power receiving coil 29 to generate an induced voltage, supplying AC power to the fusion cutting device 7. That is, in the embodiment, power is fed to the fusion cutting device 7 through electromagnetic coupling.

<Fusion Cutting Device>

Figure 5:
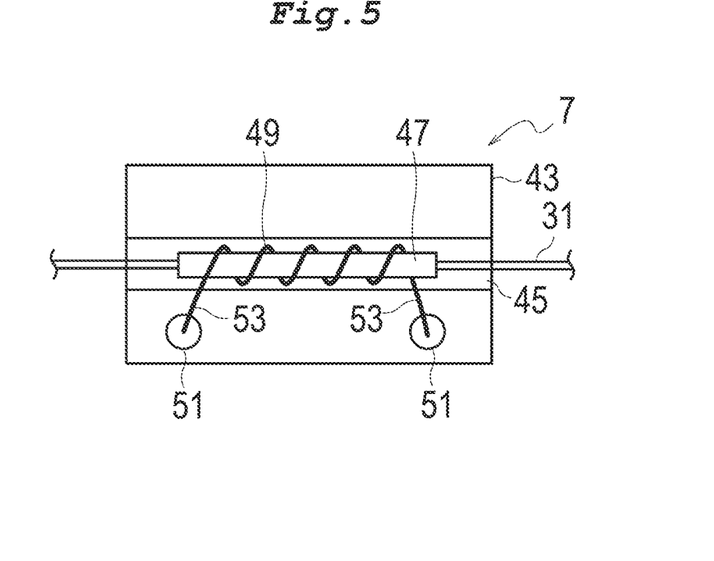
FIG. 5 shows the internal structure of a fusion cutting device.
Figure 6:
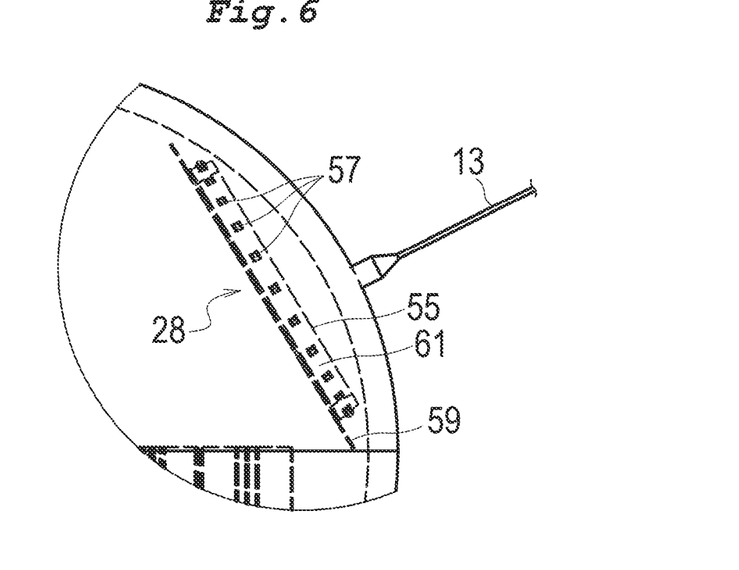
FIG. 6 is an enlarged view showing a flasher (light-emitting device).

FIG. 5 shows the internal structure of the fusion cutting device 7 with a part of a fusion cutting device body 43 removed. As discussed earlier, the fusion cutting device 7 is an external load (electrical component) configured to be operated by a power fed from the lithium-ion battery 17 via the power feeding coil 19 and the power receiving coil 29 through contactless power transmission. The fusion cutting device 7 includes a groove portion 45, a tube-like closed-loop member housing portion 47, and an electric heater portion 49. The groove portion 45 is formed in the fusion cutting device body 43. The closed-loop member housing portion 47 allows the closed-loop member 31 to slidably pass through the groove portion 45. The electric heater portion 49 is wound in a coil outside the closed-loop member housing portion 47. The electric heater portion 49 is connected to the power receiving coil 29 using lead wires 53 through holes 51 and 51 formed in the fusion cutting device body 43. Although not shown, the closed-loop member housing portion 47 and the electric heater portion 49 are covered with silicon rubber to have a water-proof structure.

As with the closed-loop member 31, the closed-loop member housing portion 47 is formed from a thermoplastic material, and fused by heat generated by the electric heater portion 49. If the closed-loop member housing portion 47 is formed from a thermoplastic material having a melting point lower than or equal to the melting point of the thermoplastic material forming the closed-loop member 31, the closed-loop member housing portion 47 is first fused and the closed-loop member 31 is fused after that, or at substantially the same time, when the electric heater portion 49 generates heat. Thus, when the transducer 11 receives a release signal and the power receiving coil 29 generates an induced voltage, the electric heater portion 49 of the fusion cutting device 7 generates heat to fuse the closed-loop member 31, thereby opening the closed loop.

<Charge Power Receiving Coil>

As with the power feeding coil 19, the charge power receiving coil 27 is an air-core coil in a swirling shape, and fixed to an inner wall surface of the glass sphere 15 with an adhesive material such that the winding axis of the coil is oriented toward the wall surface of the glass sphere 15. The charge power receiving coil 27 is connected to a charge circuit (not shown) configured to charge the lithium-ion battery 17. When a charge power feeding coil (not shown) connected to an external power source is located opposite to the charge power receiving coil 27 and caused to generate magnetic flux, an induced voltage is generated to charge the lithium-ion battery 17. The lithium-ion battery 17 is charged on a ship or on land before the underwater observation apparatus 1 is put into the sea or after the observation apparatus body 3 is recovered. Alternatively, the lithium-ion battery 17 may be charged underwater by a robot such as a remotely operated vehicle (ROV) having a charge power feeding coil.

<Matching Coil>

As discussed above, the observation apparatus body 3 includes the transducer 11, the communication circuit board 23, and the matching coil 25 for impedance matching to perform acoustic communication. In the embodiment, the power feeding coil 19 and the power receiving coil 29 are provided to feed power to the fusion cutting device 7 in a non-contact manner. Therefore, magnetic flux generated by the power feeding coil 19 may interlink with the matching coil 25 to cause the matching coil 25 to generate an induced voltage, depending on the position and the direction of the matching coil 25. If the power feeding coil 19 and the power receiving coil 29 are provided for contactless power transmission and it is necessary that another coil should be installed in the glass sphere together, it is necessary to determine the positional relationship among the coils. This is particularly the case if the glass sphere has a small diameter as in the embodiment. Thus, in the embodiment, the power feeding coil 19 and the matching coil 25 are arranged such that a first assumed magnetic force line extending in the coil winding axis direction of the power feeding coil 19 is orthogonal to a second assumed magnetic force line extending in the coil winding axis direction of the matching coil 25 and such that the distance between the two coils is made as large as possible to reduce the cross flux density. Specifically, as shown in the plan view of FIG. 2B, the positional relationship between the matching coil 25 and the power feeding coil 19 is determined such that the two coils are positioned opposite to each other across the center of the glass sphere. Such an arrangement eliminates mutual interference between the matching coil 25 and the power feeding coil 19, preventing an erroneous operation due to occurrence of noise or the like.

<Flasher (Light-Emitting Device)>

As shown in FIGS. 2A to 2C and 6, the flasher 28 includes an annular attachment portion 55, a plurality of light-emitting diodes 57, and a reflector plate 59. The light-emitting diodes 57 are located on the attachment portion 55 at constant intervals. The flasher 28 is attached to an inner wall surface of an upper front portion of the glass sphere 15. The flasher 28 is connected to the power source 18 via wires, although such wires are not shown. The flasher 28 is also connected to the signal processing device 26. When the transducer 11 receives a release signal, the flasher 28 is turned on to emit light. The attachment portion 55 has an inclined surface 61 inclined toward the center point of a portion of the glass sphere 15 that is to be exposed from the water surface (a portion of the housing). The plurality of light-emitting diodes 57 are attached to the inclined surface 61. Therefore, the plurality of light-emitting diodes 57 are located in an annular arrangement to surround the center point of the portion of the glass sphere 15. The reflector plate 59 is located around the attachment portion 55 to reflect light emitted from the light-emitting diodes 57 such that the light is oriented toward the outside of the glass sphere 15. The flasher 28 may be configured to be turned on by a magnet switch that turns on when a magnet is moved away by release of the observation apparatus body 3 from the anchor 5.

<Weight Balance of Observation Apparatus Body>

The observation apparatus body 3 according to the embodiment is configured to be stable in the vertical direction shown in FIG. 1 while the observation apparatus body 3 is sunk on the sea bottom with the anchor 5 attached thereto. In contrast, the weight balance of the observation apparatus body 3 and the respective attachment positions of the radio beacon antenna 13 and the flasher 28 are determined such that the radio beacon antenna 13 projects upward from the water surface and light emitted from the flasher 28 is emitted upward of the water surface after the observation apparatus body 3 is released from the anchor 5 underwater and moves upward by buoyancy to the water surface.

Figure 7:
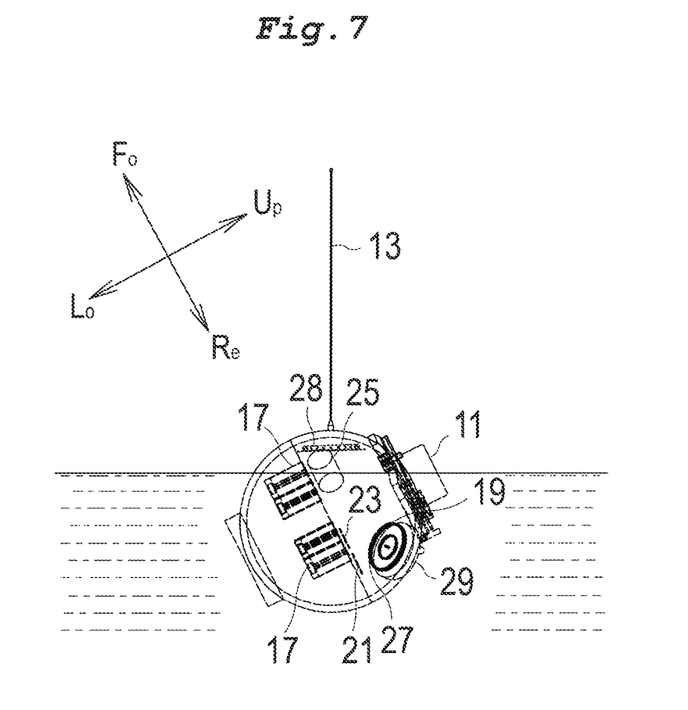
FIG. 7 shows the body of the underwater observation apparatus according to the embodiment of FIG. 1 which has moved upward to a water surface after being released.

Specifically, the lithium-ion battery 17 is located close to the bottom portion of the observation apparatus body 3. The transducer 11 which is covered by a cover made of urethane rubber is attached to the top portion of the observation apparatus body 3. This is because the urethane rubber has a specific gravity of about 1 and generates a rotational force due to the moment when the observation apparatus body 3 comes above the water. The power feeding coil 19, the charge power receiving coil 27, and the power receiving coil 29 are all located in rear of the observation apparatus body 3, which is opposite to the side where the radio beacon antenna 13 is installed. The power feeding coil 19 and the charge power receiving coil 27 are spaced from each other, and the power receiving coil 29 and the charge power receiving coil 27 are also spaced from each other. The oscillation circuit board 21 and the communication circuit board 23 are also located in rear of the observation apparatus body 3. It should be noted, however, that the matching coil 25 is located close to the front of the observation apparatus body 3 for anti-noise measures. Moreover, the radio beacon antenna 13 is provided to project obliquely from an upper front portion of the observation apparatus body 3. Likewise, the flasher 28 is attached to an internal wall portion of the glass sphere 15 corresponding to the portion where the radio beacon antenna 13 is provided across the wall portion of the glass sphere 15. Such an arrangement of the components allows the radio beacon antenna 13 to project upward from the water surface as shown in FIG. 7 when the observation apparatus body 3 is released underwater and the glass sphere 15 is exposed from the water surface. In addition, light emitted from the flasher 28 is emitted obliquely upward with respect to the water surface. Therefore, a position signal is reliably transmitted and light is emitted to a worker engaged in recovery work on a ship or the like when the observation apparatus body 3 moves upward by buoyancy to the water surface, facilitating recovery of the observation apparatus body 3.

<Fixation of Observation Apparatus Body to Anchor>

The observation apparatus body 3 is fixed to the anchor 5 according to the following procedures:

(1) The observation apparatus body 3 is located at a position for fixation to the anchor 5 (see FIG. 1). In the embodiment, the observation apparatus body 3 is located in the frame of the anchor 5.

(2) The turning arms 35 are caused to pass through the corresponding retention rings 39 of the coupling members 37, one end of which is fixed to the anchor 5.

(3) The closed-loop member 31 in the open state, before forming a closed loop, is located along the three turning arms 35, and caused to pass through the closed-loop member housing portion 47 of the fusion cutting device 7. Then, end portions of the closed-loop member 31 in the open state are coupled to each other to form a closed loop. The closed-loop member 31 can be adjusted in length and not to be slackened since the closed-loop member 31 is slidably housed in the closed-loop member housing portion 47.

The observation apparatus body 3 is fixed to the anchor 5 through the procedures described above. In case of an ocean bottom seismograph, the ocean bottom seismograph is transported to a location of measurement by ship or the like when preparations are finally made, and put into the sea from the sea surface to be located on the sea bottom.

<Recovery of Observation Apparatus Body>

If the observation apparatus body 3 is to be recovered when measurement is finished, for maintenance of the measurement device, or the like, the fusion cutting device 7 is actuated to release the observation apparatus body 3 from the anchor 5 according to the following procedures:

(1) A release signal is transmitted. The release signal is transmitted as an acoustic signal from on the sea, for example.

(2) When the transducer 11 receives the release signal, the signal processing device 26 turns on the oscillation circuit 20 and the flasher 28. (If the flasher 28 is controlled so as to be turned on and off through a magnet switch, the flasher 28 is not turned on yet.)

(3) When the oscillation circuit 20 is turned on, the power feeding coil 19 generates magnetic flux, which interlinks the power receiving coil 29. This causes the power receiving coil 29 to generate an induced voltage.

(4) The closed-loop member housing portion 47 and the closed-loop member 31 are fused by heat produced when AC power is applied to the electric heater portion 49 of the fusion cutting device 7.

(5) When the closed-loop member 31 is fused to open the closed loop, the turning arms 35 are released, and turned in the direction away from the observation apparatus body 3 by the tension of the coupling members 37. Then, when the turning arms 35 are turned, the retention rings 39 are disengaged from the turning arms 35.

(6) The observation apparatus body 3 is released from the anchor 5 to move upward by buoyancy. (If the flasher 28 is controlled so as to be turned on and off through a magnet switch, the flasher 28 is now turned on.)

(7) After that, the signal processing device 26 turns off the oscillation circuit 20, which applies a current from the power source 18 to the electric heater portion 49, based on physical variations (such as variations in water pressure, inclination angle, acceleration, elapsed time, etc., for example) due to the release of the observation apparatus body 3 from the anchor 5, or when a timer times out.

(8) Once the observation apparatus body 3 has moved upward by buoyancy to the water surface, the observation apparatus body 3 is oriented upward with respect to the water surface with the radio beacon antenna 13 projecting upward from the water surface. In addition, light emitted from the flasher 28 is emitted obliquely upward with respect to the water surface (see FIG. 7).

The procedures described above enable the observation apparatus body 3 to be reliably recovered in a short time.

The above embodiment is described by way of example only, and may be modified without departing from the scope and spirit of the present invention. For example, in the embodiment described above, the power feeding coil and the power receiving coil are planar. However, the power feeding coil may be configured such that an air-core portion of the coil projects toward a wall surface of the glass sphere, and the power receiving coil may be configured such that an air-core portion of the coil projects in a direction away from a wall surface of the glass sphere.

In the embodiment described above, in addition, the fusion cutting device of the release structure serves as the external load to be supplied with power through contactless power transmission. However, another component may serve as the external load. For example, the flasher for the usage described above may have a watertight structure and be located outside of the glass sphere to be supplied with power through contactless power transmission. If the external load is driven by DC power, an AC-DC conversion circuit may be provided on the side of the power receiving coil.

In the embodiment described above, further, the release structure includes the fusion cutting device. However, the release structure may be of a powder type in which a cutting blade configured to cut a cable coupling between the observation apparatus body and the weight structure is powered by explosion of powder, or of a galvanic corrosion type in which a metal plate or a metal wire coupling between the observation apparatus body and the weight structure is forcibly subjected to galvanic corrosion to be cut.

In the embodiment described above, the observation apparatus body itself is provided with buoyancy. In the present invention, however, a buoyant member that is separate from the observation apparatus body or a buoyant material that has a small specific gravity and that is pressure-resistant may be attached to the observation apparatus body to provide buoyancy. Alternatively, the observation apparatus body may not be provided with buoyancy, and may be recovered by a robot such as an ROV.

INDUSTRIAL APPLICABILITY

As described above, the underwater observation apparatus according to the present invention allows power for driving the external load to be supplied from the power source housed inside of the housing through contactless power transmission. Therefore, there is no need to form a through hole in a wall of the housing, which avoids reducing the strength of the housing and facilitates providing a watertight structure. Providing the charge power receiving coil and the charge circuit enables the lithium-ion battery serving as the power storage to be charged without opening the housing. Devising the arrangement of the matching coil of the communication device and the power feeding coil eliminates mutual interference between the matching coil and the power feeding coil, preventing an erroneous operation due to noise or the like. Adjusting the weight balance of the housing allows the radio beacon antenna and/or the flasher to be exposed from the water surface after the housing moves upward by buoyancy, facilitating recovery of the housing.

REFERENCE SIGNS LIST

1 Underwater Observation Apparatus
3 Observation Apparatus Body
5 Anchor
7 Fusion Cutting Device
9 Coupling Device
11 Transducer
13 Radio Beacon Antenna
15 Glass Sphere
17 Lithium Ion Battery
18 Power Source
19 Power Feeding Coil
20 Oscillation Circuit
21 Oscillation Circuit Board
22 Communication Circuit
23 Communication Circuit Board
25 Matching Coil
26 Signal Processing Device
27 Charge Power Receiving Coil
28 Flasher
29 Power Receiving Coil 31 Closed-Loop Member
33 Closed-Loop Shaft Member
35 Turning Arm
37 Coupling Member
39 Retention Ring
41 Matching Capacitor
43 Fusion Cutting Device Body
45 Groove Portion
47 Closed-Loop Member Housing Portion
49 Electric Heater Portion
51 Through Hole
53 Lead Wire
55 Attachment Portion
57 Light-Emitting Diode
59 Reflector Plate
61 Inclined Surface

The invention claimed is:

1. An underwater observation apparatus comprising:
a housing configured to house at least a power source including a power storage, a communication circuit of a communication device, and a signal processing device;
an external load located outside of the housing and configured to be operated by a drive power supplied from the power source;
a power feeding coil located inside of the housing to generate magnetic flux using a current supplied from the power source; and
a power receiving coil located outside of the housing to generate an induced voltage when interlinked by the magnetic flux generated by the power feeding coil, the power receiving coil being configured to supply the drive power to the external load.

2. The underwater observation apparatus according to claim 1, further comprising:
a buoyancy generating unit configured to provide buoyancy to the housing;
a weight structure to which the housing is attached; and
a coupling device configured to couple the housing with the weight structure via a remote-controlled release structure capable of releasing the housing from the weight structure, wherein
the release structure is configured to release the housing from the weight structure for recovery and to allow the housing to move upward by buoyancy.

3. The underwater observation apparatus according to claim 2, wherein
at least a part of the external load is an electrical component included in the release structure.

4. The underwater observation apparatus according to claim 3, wherein:
the coupling device includes a closed-loop member including one or more fusible portions formed from a thermoplastic material;
the release structure is located between the closed-loop member and the weight structure, and configured to retain the housing when the closed-loop member is closed and to release the housing when the closed-loop member is opened; and
the release structure includes as the electrical component one or more fusion cutting devices operable to fuse and disconnect the fusible portions of the closed-loop member to open the closed-loop member.

5. The underwater observation apparatus according to claim 4, wherein:
the communication device includes a transducer installed outside of the housing to perform acoustic communication underwater, and the communication circuit installed inside of the housing;
the communication circuit includes a matching coil for impedance matching; and
the matching coil and the power feeding coil are arranged such that a first assumed magnetic force line extending in a coil winding axis direction of the power feeding coil is orthogonal to a second assumed magnetic force line extending in a coil winding axis direction of the matching coil.

6. The underwater observation apparatus according to claim 3, wherein:
the communication device includes a transducer installed outside of the housing to perform acoustic communication underwater, and the communication circuit installed inside of the housing;
the communication circuit includes a matching coil for impedance matching; and
the matching coil and the power feeding coil are arranged such that a first assumed magnetic force line extending in a coil winding axis direction of the power feeding coil is orthogonal to a second assumed magnetic force line extending in a coil winding axis direction of the matching coil.

7. The underwater observation apparatus according to claim 2, further comprising:
a light-emitting device attached inside or outside of the housing to emit light upward of a water surface when the release structure releases and allows the housing to move upward by buoyancy for recovery and a portion of the housing is exposed from the water surface, wherein
the light-emitting device includes a plurality of light-emitting diodes located in an annular arrangement at predetermined intervals to surround a center point of the portion of the housing that is to be exposed from the water surface, and oriented at an angle determined to emit light obliquely upward with respect to the water surface.

8. The underwater observation apparatus according to claim 7, wherein:
the light-emitting device is located inside of the housing;
at least a part of the housing is optically transparent to allow transmission of the light emitted from the plurality of light-emitting diodes;
an attachment portion is provided inside of the housing, the attachment portion including an inclined surface inclined toward the center point; and
the plurality of light-emitting diodes are attached to the inclined surface.

9. The underwater observation apparatus according to claim 7, wherein:
the light-emitting device is fixed outside of the housing; and
the light-emitting device is a part of the external load.

10. The underwater observation apparatus according to claim 2, wherein:
the communication device includes a transducer installed outside of the housing to perform acoustic communication underwater, and the communication circuit installed inside of the housing;
the communication circuit includes a matching coil for impedance matching; and
the matching coil and the power feeding coil are arranged such that a first assumed magnetic force line extending in a coil winding axis direction of the power feeding coil is orthogonal to a second assumed magnetic force line extending in a coil winding axis direction of the matching coil.

11. The underwater observation apparatus according to claim 1, wherein:
    the communication device includes a transducer installed outside of the housing to perform acoustic communication underwater, and the communication circuit installed inside of the housing;
    the communication circuit includes a matching coil for impedance matching; and
    the matching coil and the power feeding coil are arranged such that a first assumed magnetic force line extending in a coil winding axis direction of the power feeding coil is orthogonal to a second assumed magnetic force line extending in a coil winding axis direction of the matching coil.

12. The underwater observation apparatus according to claim 11, wherein:
    the power storage is located close to a bottom portion of the housing;
    the transducer is located on top of the housing; and
    the power feeding coil, the power receiving coil, and other components are located such that the light emitted from the light-emitting device is emitted upward of the water surface when the housing is released underwater and a portion of the housing is exposed from the water surface.

13. The underwater observation apparatus according to claim 11, wherein:
    the housing includes a radio beacon antenna configured to transmit a position signal indicating a position of the housing which has been released to move upward by buoyancy;
    the power storage is located close to a bottom portion of the housing;
    the transducer is located on top of the housing; and
    the power feeding coil, the power receiving coil, and other components are located such that the radio beacon antenna projects upward from the water surface when the housing is released underwater and a portion of the housing is exposed from the water surface.

14. The underwater observation apparatus according to claim 1, wherein
    the power feeding coil and the power receiving coil are each an air-core coil in a swirling shape.

15. The underwater observation apparatus according to claim 14, wherein
    the power feeding coil is configured such that an air-core portion of the coil projects toward a wall surface of the housing.

16. The underwater observation apparatus according to claim 14, wherein
    the power receiving coil is configured such that an air-core portion of the coil projects in a direction away from a wall surface of the housing.

17. The underwater observation apparatus according to claim 1, wherein
    the power receiving coil is molded.

18. The underwater observation apparatus according to claim 1, wherein
    the power source further includes a charge power receiving coil located inside of the housing to be interlinked by magnetic flux generated by a charge power feeding coil to be located outside of the housing, and a charge circuit configured to charge the power storage using output from the charge power receiving coil.

* * * * *